(12) United States Patent
Abraham et al.

(10) Patent No.: US 12,411,870 B2
(45) Date of Patent: Sep. 9, 2025

(54) SCALABLE MACHINE LEARNING-DRIVEN SEGMENTATION SYSTEM

(71) Applicant: Airbnb, Inc., San Francisco, CA (US)

(72) Inventors: Timothy Abraham, Berkeley, CA (US); Alexandre Salama, Paris (FR)

(73) Assignee: Airbnb, Inc., San Francisco, CA (US)

(*) Notice: Subject to any disclaimer, the term of this patent is extended or adjusted under 35 U.S.C. 154(b) by 0 days.

(21) Appl. No.: 18/790,420

(22) Filed: Jul. 31, 2024

(65) Prior Publication Data

US 2025/0053578 A1     Feb. 13, 2025

Related U.S. Application Data

(60) Provisional application No. 63/531,592, filed on Aug. 9, 2023.

(51) Int. Cl.
| | | |
|---|---|---|
| G06F 16/00 | (2019.01) | |
| G06F 16/22 | (2019.01) | |
| G06F 16/28 | (2019.01) | |

(52) U.S. Cl.
CPC ........ *G06F 16/285* (2019.01); *G06F 16/2246* (2019.01)

(58) Field of Classification Search
CPC .......................... G06F 16/285; G06F 16/2246
USPC .......................................................... 707/737
See application file for complete search history.

(56) References Cited

U.S. PATENT DOCUMENTS

| | | | |
|---|---|---|---|
| 2010/0145801 A1* | 6/2010 | Chekuri | G06Q 30/0253 705/26.1 |
| 2014/0257935 A1* | 9/2014 | Killoh | G06Q 30/0276 705/7.35 |
| 2021/0117873 A1* | 4/2021 | Vakhutinsky | G06Q 10/04 707/707 |

* cited by examiner

*Primary Examiner* — Alexandria Y Bromell
(74) *Attorney, Agent, or Firm* — Schwegman Lundberg & Woessner, P.A.

(57) ABSTRACT

Systems and methods are provided to classify activities into clusters. The systems and methods access data representing activity on a network site and generate, based on the data, a plurality of feature sets representing periods of activeness on the network side. The systems and methods form a subset of the plurality of feature sets by reducing dimensionality of the plurality of feature sets. The systems and methods generate a plurality of clusters of the subset of the plurality of feature sets, each cluster being associated with a label representing a different type of activeness on the network site, and generate a database query set based on the plurality of clusters and the plurality of feature sets to classify one or more activities on the network site into one of the plurality of clusters.

20 Claims, 16 Drawing Sheets

700

| id_listing | availability_rate | streakiness | quarters_w_availability | max_consecutive_months |
|---|---|---|---|---|
| | 710 | 720 | 730 | 740 | 750 |
| 123 | 0.8 | 0.002 | 4 | 7 |
| 234 | 0.0 | 0.000 | 0 | 0 |
| 345 | 1.0 | 0.003 | 4 | 12 |
| 456 | 0.1 | 0.001 | 2 | 1 |
| 567 | 0.25 | 0.001 | 1 | 3 |

| id_listing | availability_rate | streakiness | quarters_w_availability | max_consecutive_months |
|---|---|---|---|---|
| 123 | 0.8 | 0.002 | 4 | 7 |
| 234 | 0.0 | 0.000 | 0 | 0 |
| 345 | 1.0 | 0.003 | 4 | 12 |
| 456 | 0.1 | 0.001 | 2 | 1 |
| 567 | 0.25 | 0.001 | 1 | 3 |

FIG. 7

| Cluster Intuition | Final Cluster Name |
|---|---|
| Listings that have 100% availability throughout the year, indicating a constant readiness to host. | Always On |
| Listings that are almost always available throughout the year, suggesting a consistent and continuous hosting commitment. | Year Long |
| Listings with availability concentrated in long, mostly consecutive blocks, generally spanning two to three seasons. | Long Seasonal |
| Listings with availability concentrated in long, predominantly consecutive blocks, typically spanning a single season. | Short Seasonal |
| Listings that exhibit availability patterns occurring on an intermittent basis throughout the year. | Part Time |
| Listings with infrequent periods of availability, often with gaps between them. | Sporadic |
| Listings with sporadic periods of availability, often separated by significant gaps. These listings may align their availability with specific events or occasions. | Event Motivated |
| Listings with no availability throughout the year, indicating a complete lack of hosting intention. | Fully Blocked |

```
SELECT
    listing_id ,
    CASE
        WHEN   availability = 1
        THEN   'Always_On'
        WHEN   availability = 0
        THEN   'Fully_Blocked'
        WHEN   m_streak_rate >= 0.05
        THEN   'Sporadic'
        -- <<<Rest of the code>>>
    END AS listing_cluster
FROM
    listing_feature_set ;
```

| | Listings examples | |
|---|---|---|
| | 1310 Alice's Listing | 1320 Max's Listing |
| Location | Paris | Paris |
| Tenure | 8+ years | 8+ years |
| Status | Superhost | Superhost |
| Calendar availability | 1312 "Seasonal"? (Only during Summer) | 1322 "Full Time"? (Always Available) |

FIG. 13

SCALABLE MACHINE LEARNING-DRIVEN SEGMENTATION SYSTEM

PRIORITY

This application is a non-provisional of and claims priority to U.S. Provisional Application No. 63/531,592, filed Aug. 9, 2024, which is hereby incorporated by reference in its entirety.

BACKGROUND

An online marketplace may provide a number of services, such as accommodations, tours, transportation, and the like, and allow users to reserve or "book" one or more services. For example, a first user (e.g., host) can list one or more services on the online marketplace and a second user (e.g., guest) can request to view listings of services for a particular location (e.g., San Francisco) that may include a listing for the first user's service.

BRIEF DESCRIPTION OF THE DRAWINGS

Various ones of the appended drawings merely illustrate examples of the present disclosure and should not be considered as limiting its scope.

FIGS. 4-13 are various diagrams, according to some examples.

DETAILED DESCRIPTION

Figure 1:
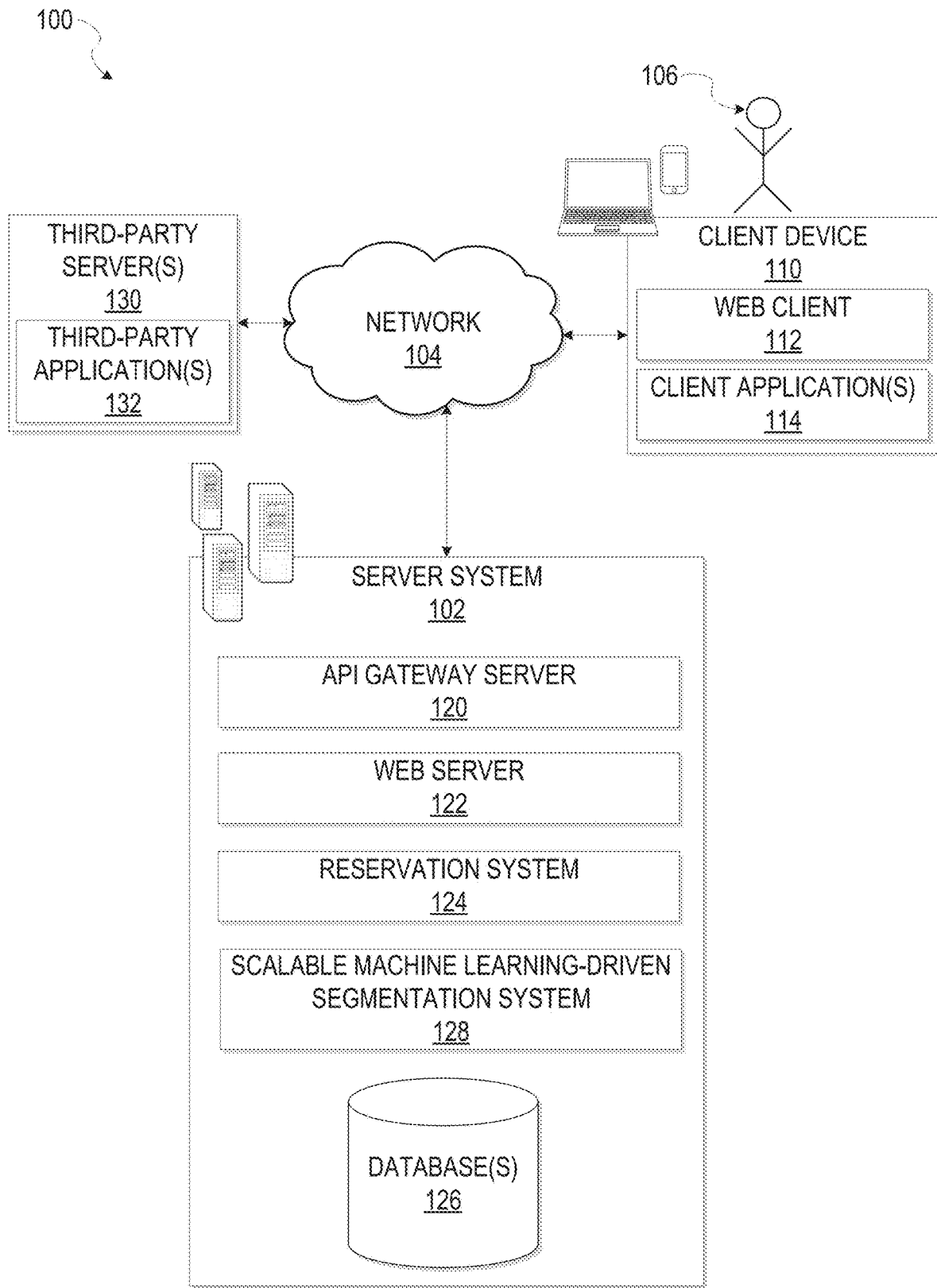
FIG. 1 is a block diagram illustrating a networked system, according to some examples.

Systems and methods described herein relate to a scalable machine learning-driven segmentation system. The growing abundance of customer data collected by online network sites has opened up new possibilities for advanced analysis.

Online marketplaces provide a number of products, services, and experiences. One example online marketplace is a network site that hosts listings for accommodations. The network site can be used to book accommodations and experiences each provided by a host or user of many hosts/users globally. These listings, unlike traditional hotels, display diverse temporal availability patterns that reveal hosts' intentions and constraints and complementing static attributes such as location, property size, or average price. However, existing methodologies fall short for calendar data segmentation.

Specifically, these online platforms (e.g., those that facilitate transactions such as accommodation marketplaces) face significant challenges in managing a vast array of listings efficiently. Each listing has unique characteristics and availability patterns, and the absence of a systematic approach to classify these listings into distinct clusters leads to considerable inefficiencies and resource wastage. Without proper classification, platforms may not optimally allocate marketing and support resources, often resulting in the unnecessary sending of communications to users who may not respond, thereby wasting resources and bandwidth. This scattergun approach to resource deployment can lead to expenditures that do not yield proportional returns and diminish the overall effectiveness of marketing efforts.

Moreover, the lack of clustering adversely affects the user experience. Both listers (such as hosts) and seekers (such as guests) may struggle to find suitable matches. For hosts, this inefficiency can translate into lost revenue opportunities due to their listings not receiving appropriate visibility. For users booking reservations, it results in frustration and time wasted sifting through unsuitable listings. Additionally, handling and analyzing the vast amounts of data generated by such platforms becomes cumbersome and less effective without clustering, thereby hindering data-driven decisions crucial for strategic growth. As the platform grows, the increase in the number of listings exacerbates these issues, making it challenging to scale operations efficiently. The lack of a scalable system to categorize and manage these listings efficiently can stall the platform's ability to expand and accommodate more users without a decline in service quality.

In response to these technical challenges, a novel, scalable segmentation methodology and system is provided herein using "availability" as an example. The methodology starts with an extensive feature set incorporating elements such as "streaks of availability." Further, K-means is used to discover natural groupings of listings (clusters), which are validated against user research, customer metadata, and experimental results. Finally, using clustering features as predictors and new segments as targets, a decision tree model is trained. This model is then translated into a database query set (e.g., one or more server query language (SQL) statements), thereby ensuring the integration of the segmentation within a data warehouse.

For example, the disclosed techniques can be used to classify activities into clusters. The disclosed techniques access data representing activity on a network site and generate, based on the data, a plurality of feature sets representing periods of activeness on the network side. The disclosed techniques form a subset of the plurality of feature sets by reducing dimensionality of the plurality of feature sets. The disclosed techniques generate a plurality of clusters of the subset of the plurality of feature sets, with each cluster being associated with a label representing a different type of activeness on the network site, and generate a database query set (e.g., one or more SQL statements) based on the plurality of clusters and the plurality of feature sets to classify one or more activities on the network site into one of the plurality of clusters.

Although the disclosed system relates to an online marketplace such as for accommodation reservations, similar techniques can be applied more broadly to any other type of system for performing large-scale customer segmentation (e.g., segmenting social media users based on their engagement, shopping patterns of users on a shopping network site, drivers and/or riders in a ridesharing network site, and so forth). This approach is particularly useful for network sites where temporal data plays an important role.

FIG. 1 is a block diagram illustrating a networked system 100, according to some examples. The networked system 100 may include one or more computing devices such as a client device 110. The client device 110 may comprise, but is not limited to a mobile phone, desktop computer, laptop, portable digital assistant (PDA), smart phone, tablet, ultrabook, netbook, laptop, multiprocessor system, microprocessor-based or programmable consumer electronic system, game console, set-top box, computer in a vehicle, wearable device (e.g., smart watch, smart glasses), or any other communication device that a user may utilize to access the networked system 100. In some examples, the client device 110 (also referred to as user device) may comprise a display module (or component) (not shown) to display information (e.g., in the form of user interfaces).

In further examples, the client device 110 may comprise one or more of touch screens, accelerometers, gyroscopes, cameras, microphones, Global Positioning System (GPS) devices, and so forth. The client device 110 may be a device of a user that is used to request (search for) and receive reservation information, accommodation information, entry and access information for a reserved accommodation; set or update user preferences; and so forth associated with travel. The client device 110 may also be a device of a user that is used to post and maintain a listing for a service, request and receive reservation information and guest information, generate entry and access information (e.g., access codes), set or update user preferences, and so forth.

One or more users 106 may be a person (e.g., guest, host, service personnel, customer support agent), a machine, or other means of interacting with the client device 110. In an example, the user 106 may not be part of the networked system 100 but may interact with the networked system 100 via the client device 110 or other means. For instance, the user 106 may provide input (e.g., voice input, touch screen input, alphanumeric input) to the client device 110 and the input may be communicated to other entities in the networked system 100 (e.g., third-party servers 130, a server system 102) via a network 104. In this instance, the other entities in the networked system 100, in response to receiving the input from the user 106, may communicate information to the client device 110 via the network 104 to be presented to the user 106. In this way, the user 106 may interact with the various entities in the networked system 100 using the client device 110.

The networked system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the internet, a portion of the public switched telephone network (PSTN), a cellular telephone network, a wireless network, a Wi-Fi network, a WiMAX network, another type of network, or a combination of two or more such networks. One or more portions of the network 104 may comprise short-range wireless communication, such as Bluetooth, WiFi, near field communication (NFC), ultraband, Zigbee, or other form of short-range wireless communication.

The client device 110 may access the various data and applications provided by other entities in the networked system 100 via a web client 112 (e.g., a browser, such as the Internet Explorer® browser developed by Microsoft® Corporation of Redmond, Washington) or one or more client applications 114. The client device 110 may include one or more client applications 114 (also referred to as "apps") such as, but not limited to, a web browser, a messaging application, an electronic mail (email) application, an ecommerce site application, a mapping or location application, a reservation application, an entry or keypad access application, a customer support application, and the like.

In some examples, one or more client applications 114 may be included in a given one of the client devices 110 and configured to locally provide the user interface and at least some of the functionalities, with the client application 114 configured to communicate with other entities in the networked system 100 (e.g., third-party servers 130, the server system 102), on an as-needed basis, for data and/or processing capabilities not locally available (e.g., to access reservation or listing information, request data, authenticate a user 106, verify a method of payment, receive an access code). Conversely, one or more client applications 114 may not be included in the client device 110, and then the client device 110 may use its web browser to access the one or more applications hosted on other entities in the networked system 100 (e.g., third-party servers 130, the server system 102).

The networked system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102, such as entry and access information for an accommodation. The third-party servers 130 may be a cloud computing environment, according to some examples. The third-party servers 130, and any servers associated with the third-party servers 130, may be associated with a cloud-based application, in one example.

The server system 102 may provide server-side functionality via the network 104 (e.g., the Internet or a WAN) to one or more third-party servers 130 and/or one or more client devices 110. The server system 102 is a cloud computing environment, according to some examples. The server system 102, and any servers associated with the server system 102, are associated with a cloud-based application, in one example.

In one example, the server system 102 provides server-side functionality for an online marketplace (e.g., an online network site of listings for accommodations). The online marketplace may provide various listings for trip items, such as accommodations hosted by various managers (also referred to as "owners" or "hosts") that can be reserved by clients (also referred to as "users" or "guests"), such as an apartment, a house, a cabin, one or more rooms in an apartment or house, and the like. As explained above, the online marketplace may further provide listings for other trip items, such as experiences (e.g., local tours), car rentals, flights, public transportation, and other transportation or activities related to travel.

The server system 102 may include the API gateway server 120, a web server 122, a reservation system 124, and a scalable machine learning-driven segmentation system 128 that may be communicatively coupled with one or more databases 126 or other forms of data store.

The one or more databases 126 may be one or more storage devices that store data related to the reservation system 124, the scalable machine learning-driven segmentation system 128, and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage in some examples.

The reservation system 124 manages resources and provides back-end support for third-party servers 130, third-party applications 132, client applications 114, and so forth, which may include cloud-based applications. The reservation system 124 provides functionality for viewing listings related to trip items (e.g., accommodation listings, activity listings), generating and posting a new listing, analyzing and ranking images to be posted in a new listing, managing listings, booking listings and other reservation functionality, and so forth, for an online marketplace. Further details related to the reservation system 124 are shown in FIG. 2.

Figure 2:
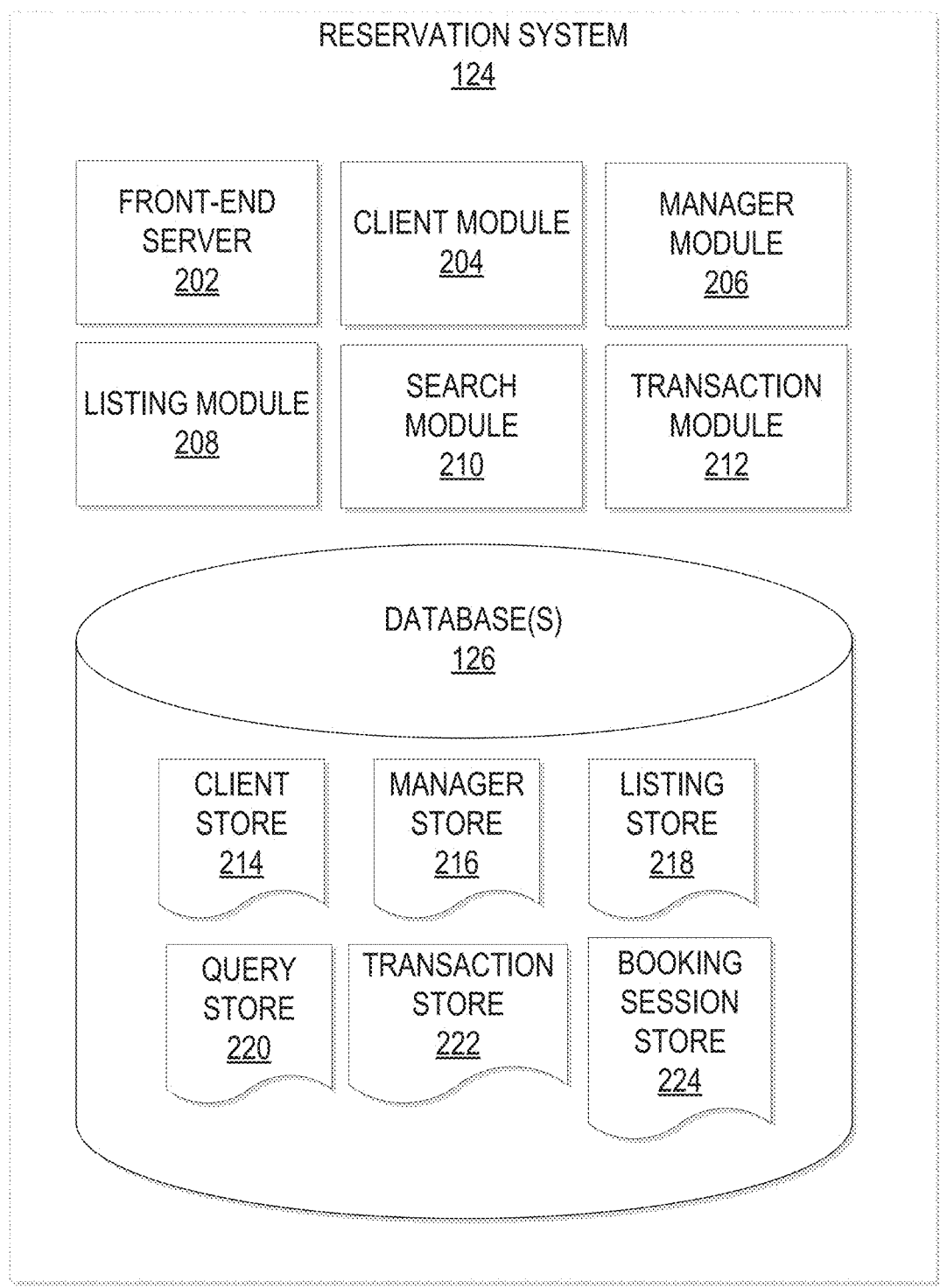
FIG. 2 is a block diagram illustrating a reservation system, according to some examples.

FIG. 2 is a block diagram illustrating a reservation system 124, according to some examples. The reservation system 124 includes a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein. Any of the disclosed "modules" can also or alternatively be implemented as "components."

The reservation system 124 may be implemented using a single computing device or a network of computing devices, including cloud-based computer implementations. The computing devices may be server-class computers including one or more high-performance computer processors and random-access memory (RAM), which may run an operating system such as Linux or the like. The operations of the reservation system 124 may be controlled either through hardware or through computer programs installed in non-transitory computer-readable storage devices such as solid-state devices or magnetic storage devices and executed by the processors to perform the functions described herein.

The front-end server 202 includes program code that allows client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 and third-party servers 130 and applications 132 to call to the API to send commands to and receive data from the reservation system 124. The front-end server 202 further includes program code to route commands and data to the other components of the reservation system 124 to carry out the processes described herein and respond to the client devices 110 accordingly.

The client module 204 includes program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, an access code, smart device preferences (e.g., user preferences), and so forth. The client's geographical location is either the client's current location (e.g., based on information provided by the client device 110) or the client's manually entered home address, neighborhood, city, state, or country of residence. The client location may be used to filter search criteria for time-expiring inventory relevant to a particular client or to assign default language preferences.

The client module 204 provides code for clients to set up and modify the client profile. The reservation system 124 allows each client to exchange communications, request transactions, and perform transactions with one or more managers.

The manager module 206 comprises program code that provides a user interface that allows managers (also referred to herein as "users," "hosts," or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216. The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 includes program code for managers to list trip items, such as time-expiring inventory, for booking by clients. The listing module 208 is configured to receive the listing from a manager describing the inventory being offered; a timeframe of its availability including one or more of the start date, end date, start time, and end time; a price; a geographical location; images and descriptions that characterize the inventory; and any other relevant information. For example, for an accommodation reservation system, a listing may include a type of accommodation (e.g., house, apartment, room, sleeping space, or other), a representation of its size (e.g., square footage, number of rooms), the dates that the accommodation is available, and a price (e.g., per night, per week, per month). The listing module 208 allows a user 106 to include additional information about the inventory, such as videos, photographs, and other media, or such as accessibility and other information.

The geographical location associated with the listing identifies the complete address, neighborhood, city, and/or country of the offered listing. The listing module 208 is also capable of converting one type of location information (e.g., mailing address) into another type of location information (e.g., country, state, city, neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory). Information from each listing calendar is stored in the listing store 218.

Figure 3:
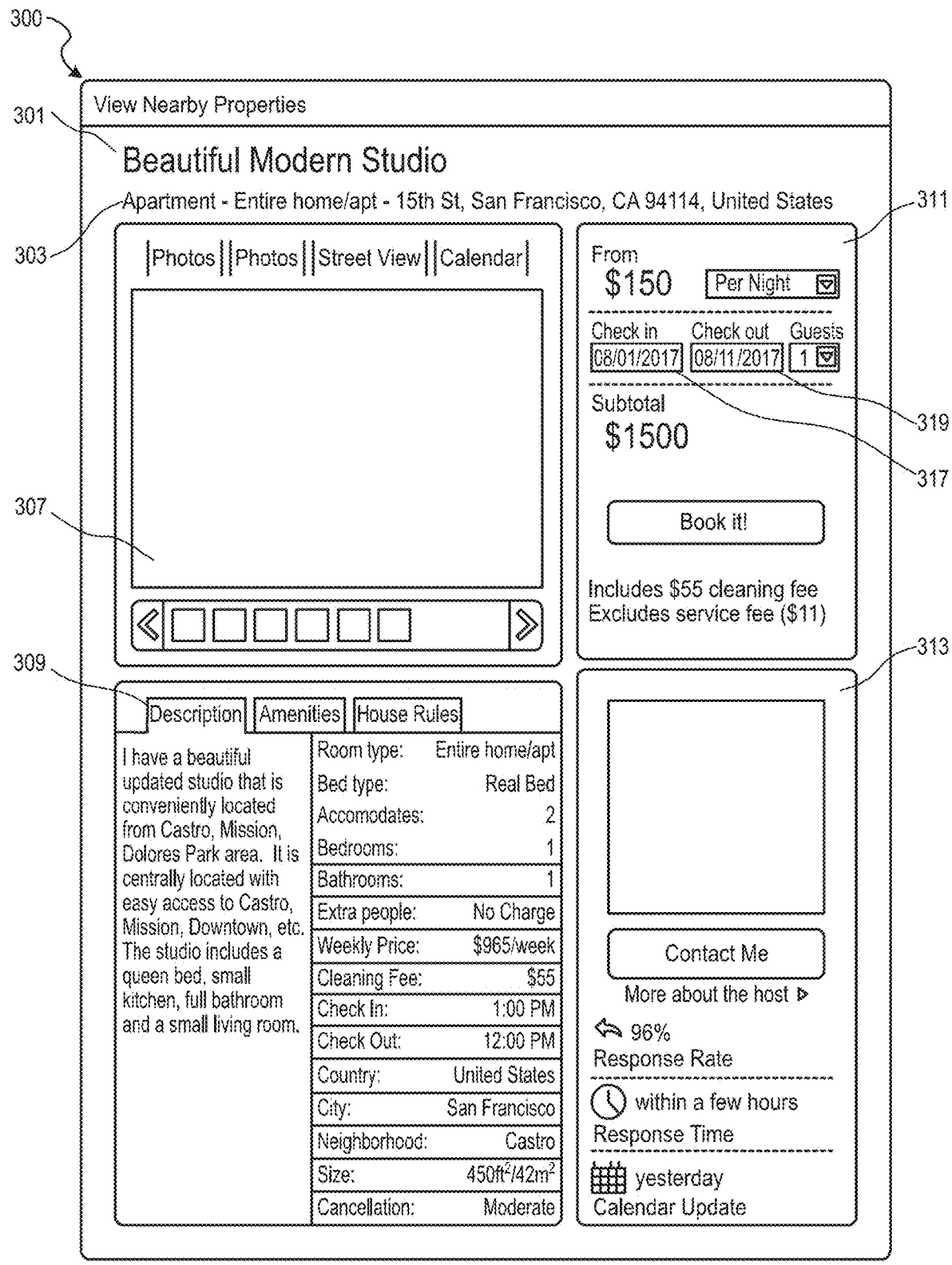
FIG. 3 illustrates an example user interface for a description of a listing for an accommodation, according to some examples.

FIG. 3 illustrates an example user interface 300 for a description of a listing for a trip item (e.g., an apartment in San Francisco) in an online marketplace (e.g., a network site). The example listing shown in FIG. 3 is for accommodations in San Francisco. In other examples, the listing could be for a tour, local experience, transportation service, or other trip item. The listing may include a title 301 and a brief description 303 of the trip item. The listing may further include photos of the trip item, maps of the area or a location associated with the trip item, a street view of the trip item, a calendar for the trip item, and so forth, which may be viewed in area 307. The listing may include a detailed description 309, pricing information 311, and the listing host's information 313. The listing may further allow a user to select a date range for the trip item by entering or choosing specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 includes program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively changing which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and, in terms of content, may vary from mere communications and general inquiries regarding the availability of inventory to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Returning to FIG. 1, the server system 102 further includes a scalable machine learning-driven segmentation system 128. The scalable machine learning-driven segmentation system 128 manages resources and provides back-end support for third-party servers 130, third-party applications 132, client applications 114, and so forth, which may include cloud-based applications. The scalable machine learning-driven segmentation system 128 can classify activities (e.g., periods of availability of different listings on the network site) into clusters. The scalable machine learning-driven segmentation system 128 accesses data representing activity on a network site and generates, based on the data, a plurality of feature sets representing periods of activeness on the network site. The scalable machine learning-driven segmentation system 128 forms a subset of the plurality of feature sets by reducing dimensionality of the plurality of feature sets. The scalable machine learning-driven segmentation system 128 generates a plurality of clusters of the subset of the plurality of feature sets, each cluster being associated with a label representing a different type of activeness on the network site and generate a database query set based on the plurality of clusters and the plurality of feature sets to classify one or more activities on the network site into one of the plurality of clusters.

In this way, important insights to inform strategic decision-making, facilitate the launch of tailored data products or marketing messaging, and provide a robust means to measure their success can be provided by the scalable machine learning-driven segmentation system 128. Specifically, listings on the reservation system 124 can exhibit a high degree of temporal variability, with some hosts offering availability spanning from weeks to seasons or even limited to specific days, such as weekends. This variable, when analyzed appropriately, can provide a powerful signal into a host's motivations, constraints, and potential objectives, thus serving as a valuable window into the dynamics of the supply side of the online marketplace.

An aggregate-level analysis such as computing "average availability per listing" does not adequately capture the richness and variability inherent in the data. Furthermore, conventional segmentation approaches, such as Recency, Frequency, Monetary (RFM) segmentation, fall short in their capacity to effectively address temporal features. Additionally, these methods are also typically employed for one-off, static analyses on small datasets, whereas many use cases call for a more dynamic, ongoing approach that accommodates daily inference for more than 8 million listings.

The scalable machine learning-driven segmentation system 128 begins its operations with the construction of an extensive feature set, incorporating elements such as the concept of "streaks of availability"—continuous periods of time when a listing is available for booking. Subsequently, the scalable machine learning-driven segmentation system 128 applies principal component analysis (PCA) processes and techniques to effectively reduce dimensionality while retaining the most informative features. For the discovery of natural groupings of listings (clusters), the scalable machine learning-driven segmentation system 128 applies a K-means algorithm and the generated clusters are validated against user research findings, customer metadata, and experimental results. The scalable machine learning-driven segmentation system 128 can then train a decision tree model using the clustering features as the predictors and the newly formed segments as the target variable. A database query set can be generated by translating the outputs of the decision tree model to ensure the propagation of the segmentation within a data warehouse.

To measure availability, the scalable machine learning-driven segmentation system 128 can define availability, visualize availability, integrate a "streakiness metric," and incorporate a seasonal factor. The scalable machine learning-driven segmentation system 128 can access data stored on the reservation system 124 indicating which days a respective accommodation associated with a listing was available to be booked or was booked within a calendar year. The scalable machine learning-driven segmentation system 128 can process this data to compute a nights available value indicating when the listing for a trip item (e.g., an accommodation) was listed as available for booking on an online marketplace and remained vacant. The scalable machine learning-driven segmentation system 128 can also process the data to compute a nights booked value representing nights when the trip item associated with the listing was initially listed as available but was later booked on the network site. The scalable machine learning-driven segmentation system 128 can perform these computations for each listing on the reservation system 124.

The scalable machine learning-driven segmentation system 128 can then compute a "nights intended to be available" value, denoted as v, for each given listing in accordance with Equation 1 below:

$$v = \sum_{t=today-364}^{today} \text{Nights}_t \tag{1}$$

(where $\text{Night}_t \in \{\text{Available}, \text{Booked}\}$)

The scalable machine learning-driven segmentation system 128 can normalize the nights intended to be available value based on a period value (e.g., the number of days in the calendar year or number of days in a measured period). The scalable machine learning-driven segmentation system 128 can compute a normalized availability rate metric in accordance with Equation 2 below:

$$\text{Availability Rate} = \frac{v}{365} \tag{2}$$

Figure 4:
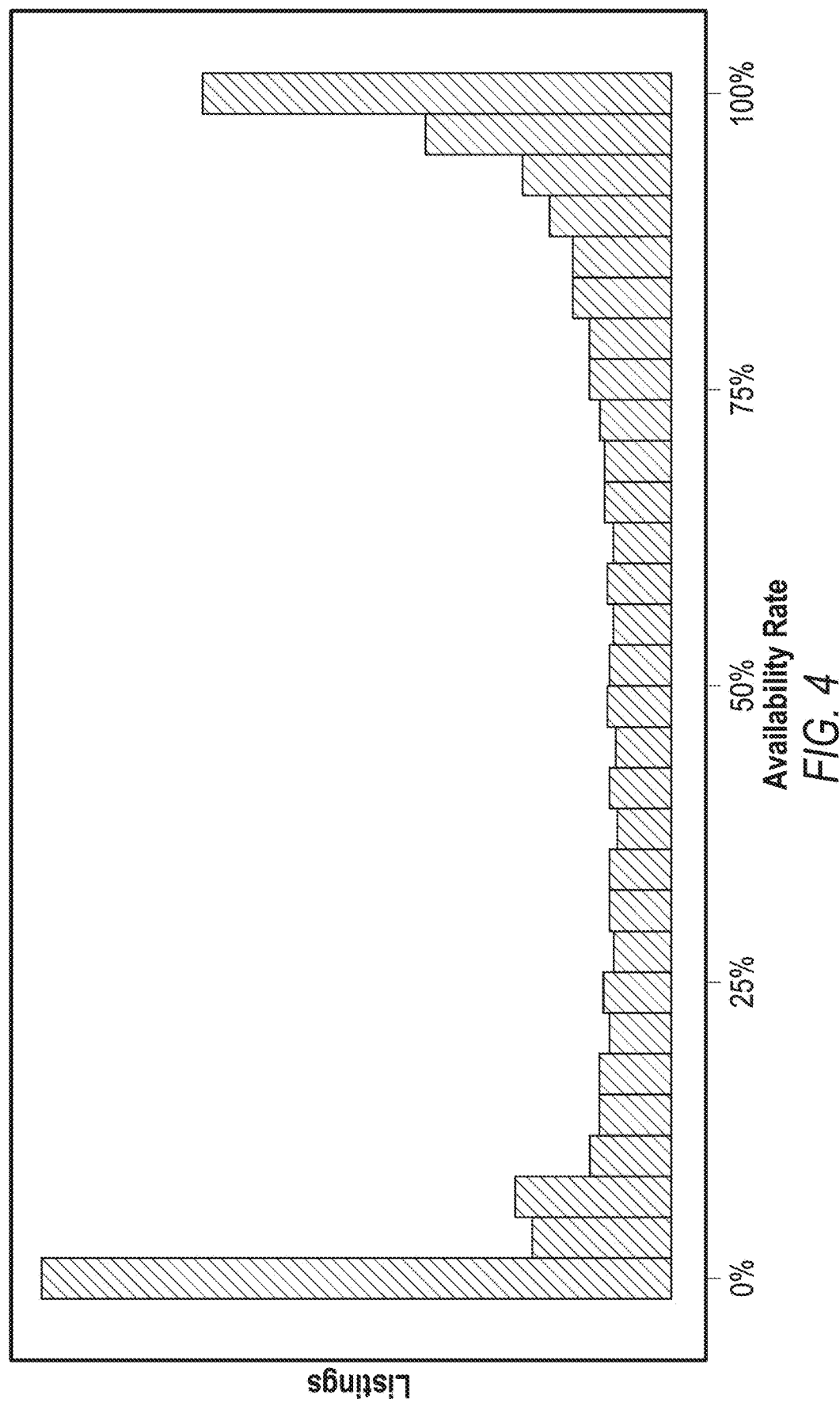
Figure 5:

FIG. 4 illustrates a graph 400 representing different availability rates of various listings on the reservation system 124, according to some examples. As seen, some listings are associated with a 100% availability rate meaning they are associated with a trip item that is always available to be booked or was always booked. Some are associated with a 0% availability rate meaning they are associated with a trip item that is never available to be booked and was never booked. Namely, the graph 400 illustrates a distribution of listings by availability rate in a previous calendar year. In some examples, the scalable machine learning-driven segmentation system 128 can generate a visual representation 500, as shown in FIG. 5, of the availability rates of graph 400. The visual representation 500 can be presented for an individual listing or for a collection of listings.

Specifically, the scalable machine learning-driven segmentation system 128 plots and visualizes the calendar raw data, as in the example in FIG. 5. For example, the visual representation 500 can present the calendar year divided into the various months 510. Within each month 510, the scalable machine learning-driven segmentation system 128 presents individual days of the month. For each day represented in a given month 510, the scalable machine learning-driven segmentation system 128 presents a first indicator 520 (e.g., a first color) on the day to indicate that a listing for a trip item was available or booked on that day. For each day represented in a given month 510, the scalable machine learning-driven segmentation system 128 presents a second indicator 530 (e.g., a second color) on the day to indicate that a listing for a trip item was unavailable and not booked on that day.

The scalable machine learning-driven segmentation system 128 can process the availability rate and the days each listing was available to be booked to generate a streakiness metric for each listing. Specifically, the diverse ways in which availability could be distributed poses a challenge in accurately characterizing the listings. While it is feasible to distinguish between "Fully Blocked" (0% availability) and "Always On" (100% availability) segments based on the extremities of the availability spectrum, the intermediate range may require a more nuanced approach. For instance, a calendar with 50% availability could exhibit various patterns, such as availability on alternate days or extended stretches of availability interspersed with periods of unavailability.

In light of these complexities, the scalable machine learning-driven segmentation system 128 computes the streakiness metric. This streakiness metric aims to complement the existing availability volume metric, by quantifying the consistency of availability patterns. In some cases, the streakiness metric represents a consecutive sequence of availability that encompasses a minimum of two consecutive days/nights of availability, followed by a subsequent period of at least two consecutive days/nights of unavailability, as described in FIG. 6. This definition establishes the criteria for identifying streaks based on the alternating pattern of availability and unavailability.

Figure 6:
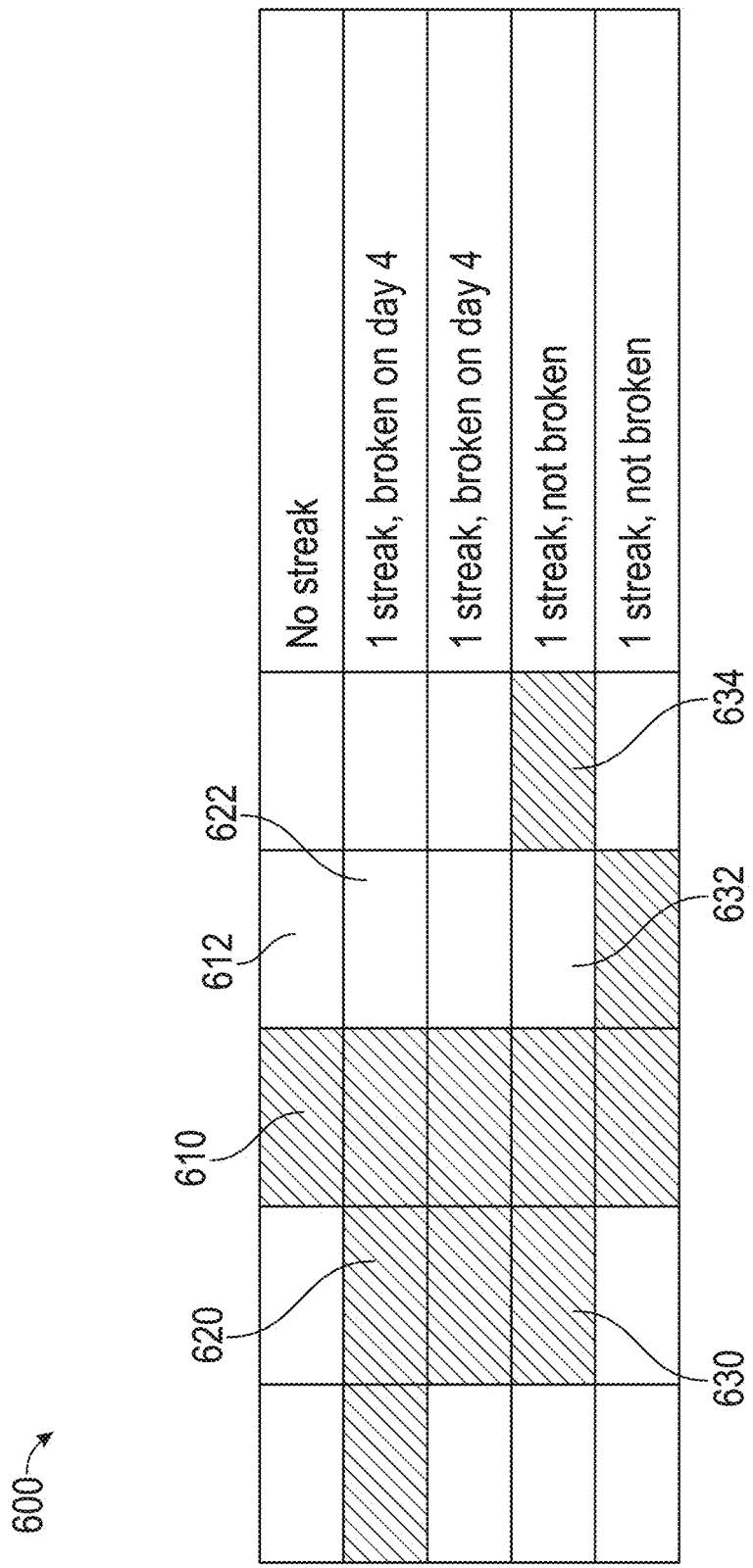

FIG. 6 shows examples 600 illustrating the streak method with a first indicator (e.g., first color) representing availability and a second indicator (e.g., a second color) representing unavailability. The scalable machine learning-driven segmentation system 128 can process the availability rate or data for each listing. The scalable machine learning-driven segmentation system 128 can then identify periods representing consecutive days that a trip item associated with the listing was available to be booked or was booked. Once a particular period of consecutive days (e.g., two or more days) is identified, the scalable machine learning-driven segmentation system 128 accumulates a value in the streakiness metric for that listing. The scalable machine learning-driven segmentation system 128 can determine that the period of consecutive days is followed by one day of unavailability for the listing. In response, the scalable machine learning-driven segmentation system 128 can determine whether an additional period of consecutive days (e.g., two or more days of availability) exists following immediately the one day of unavailability. If so, the scalable machine learning-driven segmentation system 128 does not increment or modify the accumulated value as the streak is determined to not be broken. If the scalable machine learning-driven segmentation system 128 determines that the additional period of consecutive days exists following two or more days of unavailability, the scalable machine learning-driven segmentation system 128 determines that a new streak is found and increments the value for the streakiness metric for the listing.

For example, as shown in example 600, the scalable machine learning-driven segmentation system 128 can determine that during a first period of days, the listing was available to be booked or was booked on a single one 610 that is between two adjacent days 612 during which the listing was unavailable to be booked. In such cases, the scalable machine learning-driven segmentation system 128 can determine that no streak is present and does not increment a corresponding streakiness metric for the listing. During another period, the scalable machine learning-driven segmentation system 128 can determine that the listing was available to be booked or was booked on a sequence of consecutive days 620 followed by two consecutive days 622 during which the listing was unavailable to be booked. In such cases, the scalable machine learning-driven segmentation system 128 increments the streakiness metric for the listing as one streak is found. If another sequence of consecutive days is found following the two consecutive days 622, the scalable machine learning-driven segmentation system 128 increments the streakiness metric again for the listing. During another period, the scalable machine learning-driven segmentation system 128 can determine that the listing was available to be booked or was booked on a sequence of consecutive days 630 followed by a single consecutive day 632 during which the listing was unavailable to be booked and then another sequence of consecutive days or a single day of availability 634. In such cases, the scalable machine learning-driven segmentation system 128 increments the streakiness metric for the listing one time as one streak is found even though there was a day the listing was unavailable between the two periods of availability. The day of availability following the period of unavailability does not result in incrementing the streakiness metric value because it is only a single day of unavailability between two periods of availability.

In this way, listings with associated streakiness metrics that are higher in value indicate that the listings are sporadic in availability and are not always available or booked. Listings with associated streakiness metrics that are lower in value indicate that the listings are less sporadic in availability and are available on more consecutive periods of time.

Specifically, the scalable machine learning-driven segmentation system 128 can compute the streakiness metric according to Equation 3 below where the streakiness metric value that is incremented for each listing is denoted by σ:

$$\sigma = \sum_{t=2}^{363} \delta_t, \qquad (3)$$

where δt is defined as:

$$\delta_t = \begin{cases} 1 & \text{if Night}_{t-1} \text{ is available, Night}_t \text{ is available,} \\ & \text{Night}_{t+1} \text{ is not available, and Night}_{t+2} \text{ is not available, .} \\ 0 & \text{otherwise} \end{cases}$$

In some examples, the scalable machine learning-driven segmentation system 128 can normalize the streakiness metric based on the availability rate of each listing according to Equation 4 below.

$$\text{Streakiness} = \frac{\sigma}{\nu} \quad (4)$$

Given the inherent seasonality of the listings on the reservation system 124, one additional metric that can be computed is the count of "quarters with at least one day of availability." This metric captures the distinction between listings with availability concentrated within a narrower time frame versus those with availability spread across multiple quarters. The scalable machine learning-driven segmentation system 128 can also incorporate an additional metric, "maximum consecutive months," which combines the streakiness metric and seasonality aspects. This metric identifies the longest uninterrupted period of availability for each listing.

A set of features for each listing on the reservation system 124 is generated by the scalable machine learning-driven segmentation system 128 including the availability rate, streakiness metric value, quarters with availability, and maximum consecutive months. This set of features that is generated is presented in the table 700 shown in FIG. 7. For example, the table 700 includes a listing identifier field 710 (corresponding to a unique listing in the reservation system 124). Each listing identifier field 710 is associated with a respective availability rate 720, streakiness metric value 730, quarters with availability value 740, and maximum consecutive months value 750.

In one example, the scalable machine learning-driven segmentation system 128 reduces dimensionality of the generated set of features to generate a subset of features. For example, the scalable machine learning-driven segmentation system 128 can apply PCA to reduce the dimensionality to reduce computational complexities. PCA offers a solution by transforming the original feature space into a reduced set of uncorrelated variables known as principal components. By identifying the key sources of variation in the data, PCA allows the scalable machine learning-driven segmentation system 128 to condense the feature set while preserving the most informative aspects. This reduction in dimensionality not only streamlines subsequent analysis but also enhances our ability to visualize and interpret the underlying patterns and trends within the dataset.

Next, the scalable machine learning-driven segmentation system 128 can employ K-means clustering processes to generate a plurality of clusters for the subset of features. By employing the K-means clustering algorithm, the scalable machine learning-driven segmentation system 128 can identify clusters or "segments" within a two-dimensional feature space of the subset of features. The metrics are first scaled and centered to ensure uniformity across variables.

Figure 8:
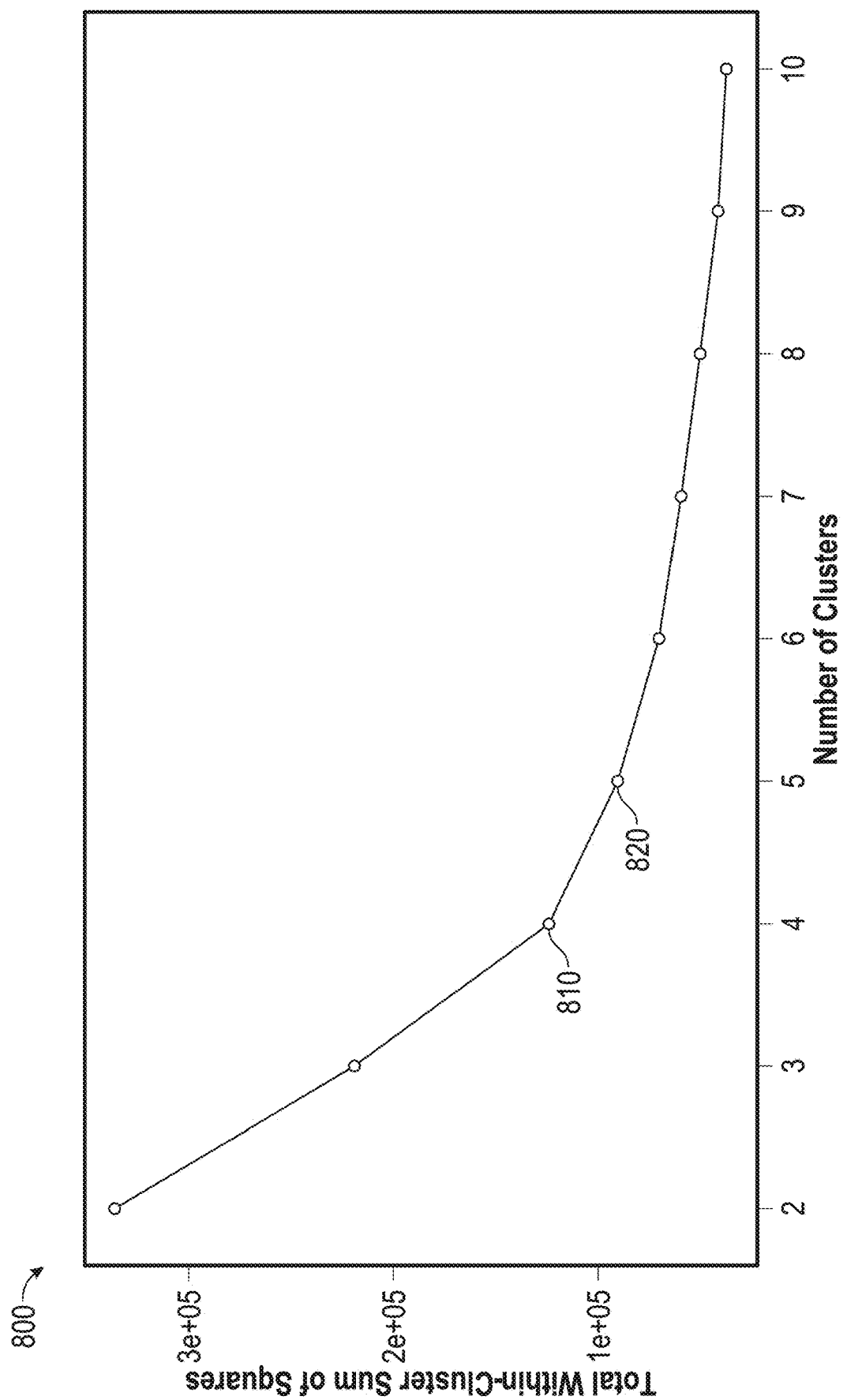

FIG. 8 shows an elbow plot 800 depicting the relationship between the number of clusters (K) and the total within-cluster sum of squares. The elbow plot 800, a monotonically decreasing function of the total sum of squares per cluster against K, indicates that either five or six clusters 810 and 820 would be suitable. The influence of the Quarters and Consecutive Months metrics may become pronounced only when employing eight clusters. The resulting plot exhibits clear separation among the clusters, as observed in the two-dimensional representation with availability rate on the X-axis and streakiness (streaks normalized by availability) on the Y-axis. The utilization of unsupervised learning algorithms, such as K-means, allows the scalable machine learning-driven segmentation system 128 to identify clusters within the dataset based on patterns and similarities. However, these clusters may lack inherent descriptions or interpretations due to the absence of ground truth labeled data.

Figure 10:
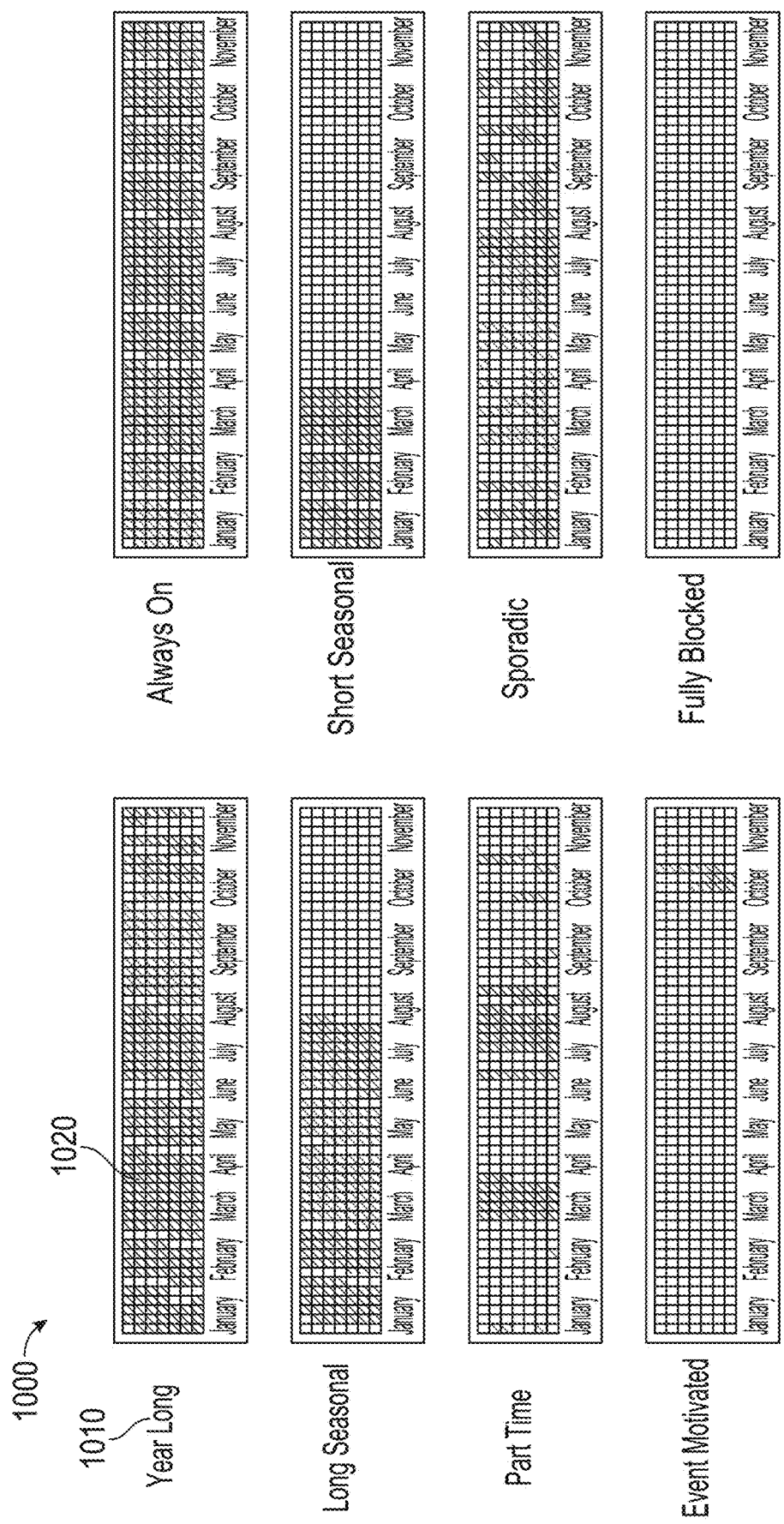

In some examples a cluster naming process is done in multiple steps. First, the scalable machine learning-driven segmentation system 128 can check the distribution of each feature (e.g., availability rate) by cluster to outline any strong differences between clusters (e.g., a cluster only has listings with 0% availability, while another one only has listings with 100% availability), which will help identify obvious natural groupings of listings. Then, the scalable machine learning-driven segmentation system 128 randomly samples a few listings from each group, and visualizes their respective calendars side-by-side (as discussed previously), in order to understand what makes them similar. Finally, the visualizations and the clusters or segments are presented to a user. The user can then assign different names to the different clusters or segments. This is summarized in the table 900 of FIG. 9, while FIG. 10 displays a "typical" calendar 1000 for each of the clusters discovered. Specifically, the cluster description field 910 provides the intuition described by the user for each cluster along with the corresponding cluster name 920. For example, the table 900 includes a first cluster intuition 912 with the corresponding cluster name 922 (e.g., year long). The graphical or visual depiction of the availability rate and other features of the listings under the first cluster intuition 912 is presented in the visual representation 1010 of the availability rate and features 1020 of the clusters with the cluster name 922.

Validating the model, derived from unsupervised techniques and subsequent intuitive labeling, poses a unique challenge. To circumvent this obstacle, the scalable machine learning-driven segmentation system 128 integrates findings of a qualitative research team into the validation process. The qualitative research team routinely conducts host surveys and creates persona profiles based on the responses received. These persona profiles shed light on the motivations, goals, and preferences of hosts, information which can be extremely valuable for the segmentation strategy. These host personas are used to validate the model's results by comparing them against the identified segments. This comparison can provide a practical confirmation of whether the algorithm's labeling aligns with the real-world motivations and actions of the hosts. For instance, if the model identifies a segment characterized by high weekend availability, this can be cross-referenced with the host personas to confirm if it is reflective of hosts who explicitly favor weekend rentals. In essence, these persona profiles serve as a form of ground truth, enabling the scalable machine learning-driven segmentation system 128 to corroborate the veracity of our segmentation.

The scalable machine learning-driven segmentation system 128 further validates the segmentation model by plotting correlations between our newly created segments with other known attributes and verifying if they align with the intuitive expectations. Below are a few examples of checks made that successfully passed.

Listings characterized as entire homes and consistently available throughout the year ("Always On" or "Year Long") are likely managed by professional hosts. This assumption is grounded in practical considerations: individuals living in their homes would not feasibly be able to list them full-time. Similarly, there may be a significantly higher proportion of "Short Seasonal" and "Long Seasonal" listings in locations known to be popular for seasonal travel, such as beach or ski destinations. This aligns with the principle of seasonal demand, as these listings may be particularly attractive during specific periods of the year.

Furthermore, the impact of major events, such as the Coachella Festival, an annual gathering for music and art enthusiasts, or the Super Bowl, the annual championship game of the National Football League (NFL), is analyzed on listing availability. In anticipation of such occasions, it is common to observe an increase in new listings activated solely for the event duration. These listings may fall into the "Event Motivated" category and demonstrate the responsiveness of hosts to high-demand periods.

Having established the clusters and assigned names to each of them, the scalable machine learning-driven segmentation system 128 has derived a set of distinctive features characterizing each cluster, such as availability and streakiness. To accomplish a prediction task, the scalable machine learning-driven segmentation system 128 employs a decision tree algorithm. A decision tree is a supervised learning technique that recursively partitions the feature space based on a series of if-else conditions. In some examples, a decision tree model is trained where the inputs are the metrics that were fed into the K-means model, and the outputs are the cluster labels found by the K-means model. This decision tree effectively gives a simple set of if-else rules 1100, shown in FIG. 11, that are applied to the metrics to get the K-means clusters. For example, for a first set of features 1110 (e.g., the availability rate being 100%), the scalable machine learning-driven segmentation system 128 generates a first cluster label 1112. For a second set of features 1020 (e.g., the availability rate being 0%), the scalable machine learning-driven segmentation system 128 generates a second cluster label 1122.

One notable advantage of utilizing a decision tree model is its inherent interpretability. The resulting tree structure can be translated directly into a series of IF statements, making it comprehensible to non-technical stakeholders. This interpretability facilitates a clear understanding of the rules and criteria that guide the cluster assignments, thereby enhancing the transparency and communicability of the segmentation results.

Translating the decision tree into a series of IF statements further enables the integration of the model into a production pipeline. Through the utilization of SQL, the IF statements can be transformed into CASE WHEN statements 1200 (shown in FIG. 12), allowing for direct implementation within a relational database system. This integration enables the decision tree model to be readily deployed in a production environment, where it can efficiently process new data and generate the corresponding prediction.

Figure 11:
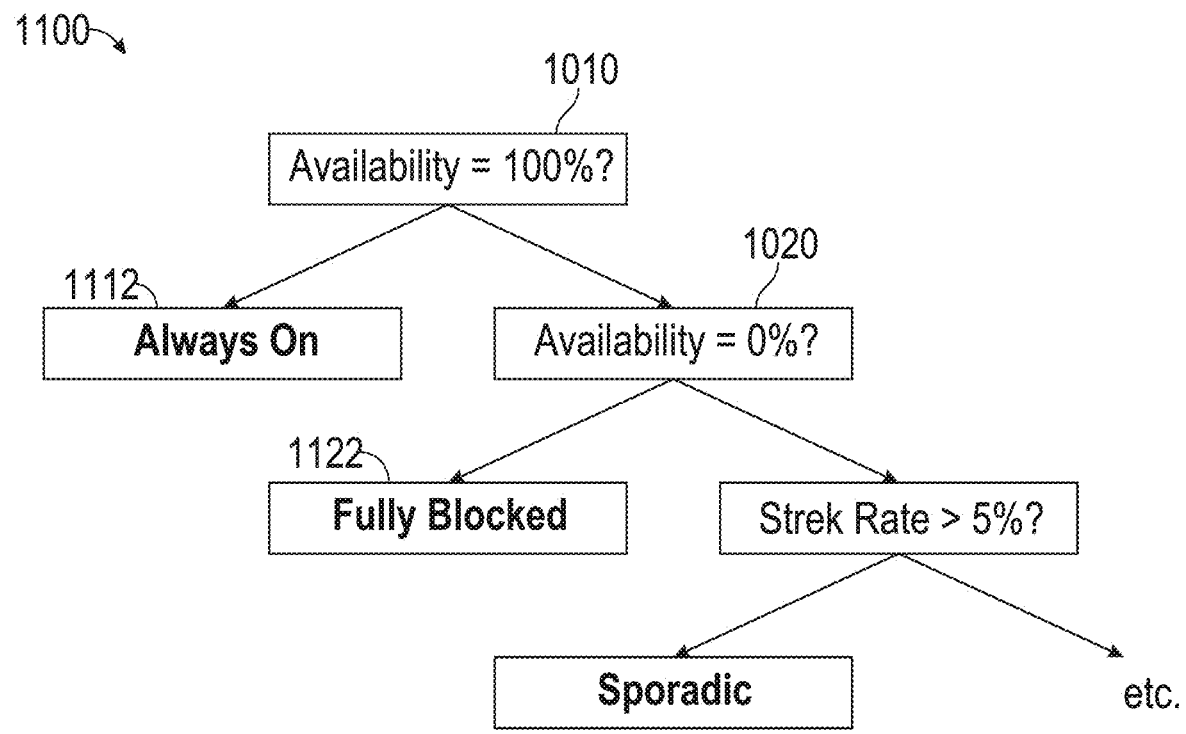

Using the illustrative structure of the decision tree in FIG. 11, the SQL query in FIG. 12 operates on the dataset listing_feature_set, with the goal of classifying new and/or existing listings into different clusters based on their availability patterns. The CASE statement serves as a control flow structure, akin to the decision tree nodes. The SQL query in FIG. 12 is an illustrative example of a SQL query translating the decision tree rules into distinct clusters. For example, the scalable machine learning-driven segmentation system 128 can apply or generate a database query periodically (e.g., every night) including the database query set. The scalable machine learning-driven segmentation system 128 can transmit the database query to the reservation system 124 to process listings and assign cluster label names to their respective calendar availability.

As shown in the diagram 1300 of FIG. 13, the scalable machine learning-driven segmentation system 128 can receive a result to the database query indicating that a first listing 1310 is associated with a first cluster name 1312. The scalable machine learning-driven segmentation system 128 can receive a result to the database query indicating that a second listing 1320 is associated with a first cluster name 1322. Based on these different cluster names, the scalable machine learning-driven segmentation system 128 can generate different communications (e.g., having different types of communications, such as telephone communications or messages, email messages, text messages, and so forth) and provide such communications at different frequencies (e.g., every day or every month) to the hosts or users associated with the respective listings. For example, the scalable machine learning-driven segmentation system 128 can transmit a first communication of a first type (e.g., email) to a first user in response to determining that activity of the first user is associated with a first cluster of the plurality of clusters. Similarly, the scalable machine learning-driven segmentation system 128 can transmit a second communication of a second type (e.g., telephone call) to a second user in response to determining that activity of the second user is associated with a second cluster of the plurality of clusters.

In the examples above, eight distinct segments were created, including "Always On," "Year Long," "Long Seasonal," "Short Seasonal," "Part Time," "Sporadic," "Event Motivated," and "Fully Blocked." Each segment was characterized by unique behavioral patterns and attributes, thereby providing an intimate understanding of the host's intent. This segmentation provides a foundation for making more informed business decisions, shaping strategies, and tailoring services to better cater to the needs of the hosts.

In practice, different business functions can utilize these segments to differentiate the business impact of their initiatives. Marketing teams can use the segments to craft better targeted messaging and content. Qualitative research teams can use the segments to learn more about hosts' motivations and goals. Lastly, product teams can integrate these segments into their key dimensions, which they utilize to measure various metrics and analyze experimental results.

The segmentation methodology described herein is stable, quick, cost-effective, and explainable. This means it can be adapted and applied to various other industries and contexts where understanding temporal engagement patterns or customer characteristics is crucial.

Social Media Platforms: This method can be used to segment customers based on their engagement with a social media platform. Insights into daily active users (DAUs) can be discerned, and unique customer segments based on activity patterns can be identified. Such segmentation can provide invaluable insights for targeted marketing, customer retention strategies, and personalized user experiences.

Ridesharing Applications: The method is applicable to the analysis of driver availability in ridesharing apps. Drivers may show different patterns of availability, which might reflect their reliance on the platform, their other commitments, or their strategies for maximizing earnings. Understanding these patterns can help ridesharing companies better manage their driver workforce, design effective incentive schemes, and improve service availability for passengers.

Streaming Services: The methodology can be employed to segment users of streaming services based on their engagement patterns. For instance, we can discern whether users typically stream music continuously throughout the day or at specific times (such as mornings or evenings), whether they engage in sporadic streaming or show long streaks of continuous streaming, and if their usage differs between weekdays and weekends. These insights can assist streaming services in crafting personalized recommendations, optimizing their content scheduling, and tailoring their marketing strategies to user behavior.

E-commerce: The methodology can be adopted to probe customer engagement patterns on e-commerce platforms. Online shoppers showcase distinct engagement patterns; some might engage frequently throughout the year, while others may be more active during sale periods or holidays. Gaining an understanding of these patterns can empower businesses to refine their marketing and sales strategies, enhance customer experience, and boost sales.

By harnessing the versatility of our approach, organizations across different sectors can gain a nuanced understanding of their customer engagement patterns. This can drive more informed decision making, thereby enabling businesses to tailor their strategies to meet the unique needs and preferences of their diverse customer segments.

Further use cases for this segmentation approach include:

Holidays and Events: Using an external dataset of national holidays and events might be used to cluster listings availability further, by separating hosts hosting on special occasions, while they are away, or to make the most of a potential surge in demand.

Locality-sensitive hashing: Using "shingling" techniques such as locality-sensitive hashing could potentially improve the ability to directly cluster similar looking calendars without the need to create a set of metrics around them.

Temporal Trend Analysis: How composition of these segments changes over time allows for the analysis of temporal trends and provide insights into how hosts' behavior changes in response to external events or changes in the market.

Figure 14:
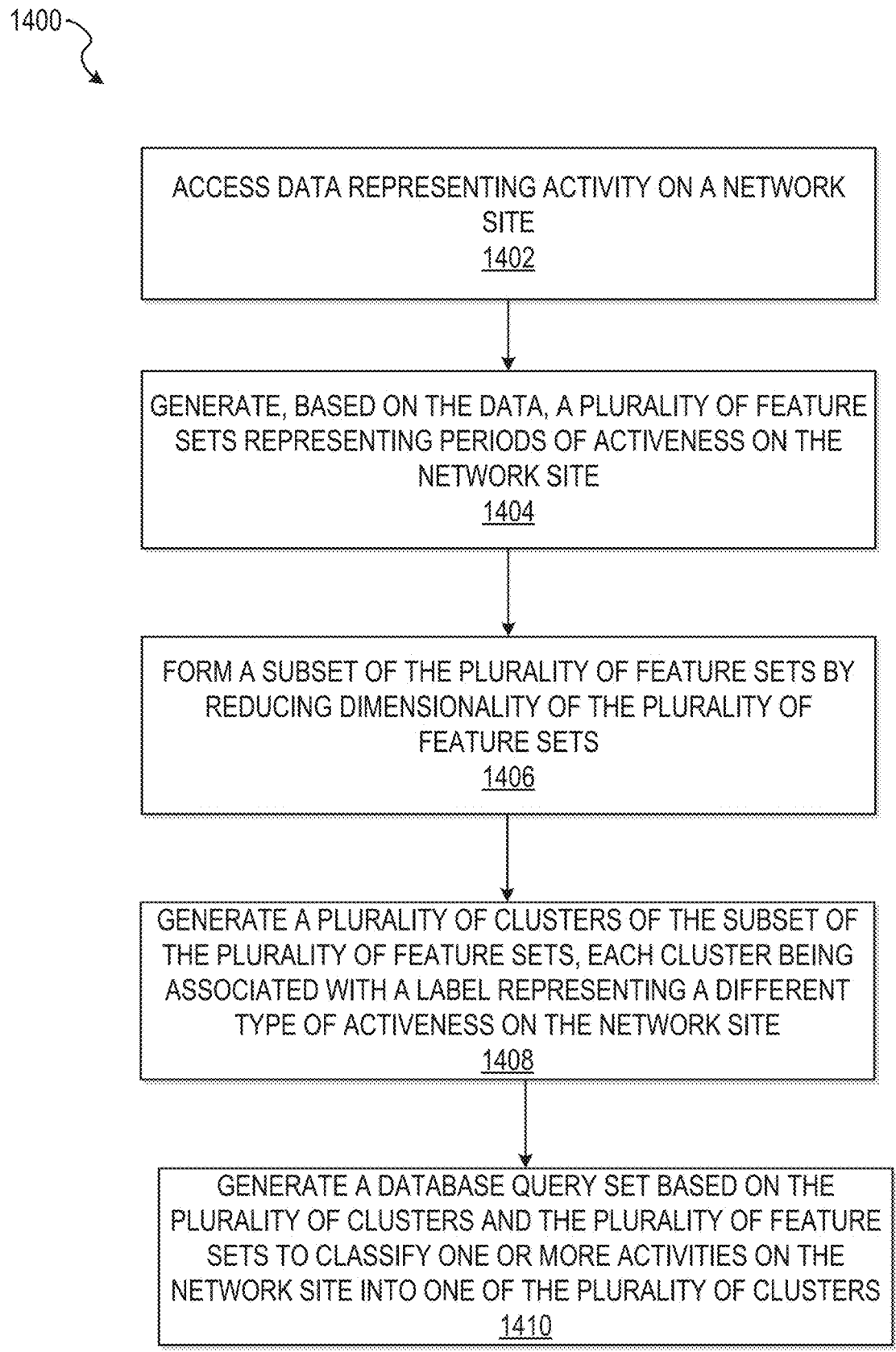
FIG. 14 is a flow chart illustrating aspects of a method, according to some examples.

FIG. 14 is a flow chart illustrating aspects of a method 1400, according to some examples. For illustrative purposes, the method 1400 is described with respect to the networked system 100 of FIG. 1. It is to be understood that the method 1400 may be practiced with other system configurations in other examples.

In operation 1402, a computing system (e.g., server system 102, reservation system 124, or scalable machine learning-driven system 128) accesses data representing activity on a network site, such as reservation system 124. Then, at operation 1404, the computing system generates, based on the data, a plurality of feature sets representing periods of activeness on the network site and, at operation 1406, the computing system forms a subset of the plurality of feature sets by reducing dimensionality of the plurality of feature sets. At operation 1408, the computing system generates a plurality of clusters of the subset of the plurality of feature sets where each cluster is associated with a label representing a different type of activeness on the network site. At operation 1410, the computing system generates a database query set based on the plurality of clusters and the plurality of feature sets to classify one or more activities on the network site into one of the plurality of clusters.

Example 1. A method comprising: accessing data representing activity on a network site; generating, based on the data, a plurality of feature sets representing periods of activeness on the network site; forming a subset of the plurality of feature sets by reducing dimensionality of the plurality of feature sets; generating a plurality of clusters of the subset of the plurality of feature sets, each cluster being associated with a label representing a different type of activeness on the network site; and generating a database query set based on the plurality of clusters and the plurality of feature sets to classify one or more activities on the network site into one of the plurality of clusters.

Example 2. The method of Example 1, wherein the data comprises a plurality of listings associated with accommodation reservations provided by different users on the network site.

Example 3. The method of Example 2, further comprising: computing, as the periods of activeness on the network site, periods of availability of each listing of the plurality of listings.

Example 4. The method of Example 3, further comprising: accessing historical availability information for each listing of the plurality of listings; determining, based on the historical availability information, a number of days within a calendar year that each listing of the plurality of listings was associated with an accommodation that was booked or available to be booked; and computing an availability rate for each listing of the plurality of listings based on the number of days associated with each listing of the plurality of listings.

Example 5. The method of Example 4, further comprising: dividing the number of days associated with each listing of the plurality of listings by a total number of days within the calendar year.

Example 6. The method of Example 5, further comprising: presenting a calendar view representing the availability rate for each listing of the plurality of listings to visually represent an availability pattern for each listing of the plurality of listings.

Example 7. The method of any one of Examples 1-4, further comprising: computing a streakiness metric for each listing of the plurality of listings, the streakiness metric representing a number of uninterrupted consecutive days that the accommodation associated with each listing was booked or available to be booked.

Example 8. The method of Example 7, further comprising: normalizing the streakiness metric based on one or more seasonality factors.

Example 9. The method of Example 8, wherein the one or more seasonality factors comprise at least one of a quarter of availability or number of consecutive months of availability.

Example 10. The method of Example 9, further comprising: generating the plurality of feature sets based on the plurality of listings, the availability rate, and the normalized streakiness metric of each listing of the plurality of listings.

Example 11. The method of Example 10, further comprising: applying a principal component analysis model to the plurality of feature sets to generate the subset of the plurality of feature sets.

Example 12. The method of Example 11, further comprising: applying K-means clustering to the subset of the plurality of feature sets to generate the plurality of clusters.

Example 13. The method of Example 12, further comprising: receiving input that assigns different labels to each cluster in the plurality of clusters.

Example 14. The method of Example 13, wherein the different labels comprise at least one of always on, year long, long seasonal, short seasonal, part time, sporadic, event motivated, or fully blocked.

Example 15. The method of any one of Examples 12-14, further comprising: applying a decision tree process to the plurality of clusters and the plurality of feature sets to generate the database query set comprising one or more SQL queries.

Example 16. The method of any one of Examples 1-15, further comprising: periodically querying the network site using the database query set to classify the one or more activities on the network site into one of the plurality of clusters.

Example 17. The method of any one of Examples 1-16, further comprising: controlling a frequency and type of communication with an individual user of the network site based on an individual cluster associated with an activity of the individual user on the network site.

Example 18. The method of Example 17, further comprising: transmitting a first communication of a first type to a first user in response to determining that activity of the first user is associated with a first cluster of the plurality of clusters; and transmitting a second communication of a second type to a second user in response to determining that activity of the second user is associated with a second cluster of the plurality of clusters.

Example 19. A system comprising: a storage device that stores instructions; and one or more processors configured by the instructions to perform operations comprising: accessing data representing activity on a network site; generating, based on the data, a plurality of feature sets representing periods of activeness on the network site; forming a subset of the plurality of feature sets by reducing dimensionality of the plurality of feature sets; generating a plurality of clusters of the subset of the plurality of feature sets, each cluster being associated with a label representing a different type of activeness on the network site; and generating a database query set based on the plurality of clusters and the plurality of feature sets to classify one or more activities on the network site into one of the plurality of clusters.

Example 20. A non-transitory computer-readable medium comprising instructions stored thereon that are executable by at least one processor to cause a computing device to perform operations comprising: accessing data representing activity on a network site; generating, based on the data, a plurality of feature sets representing periods of activeness on the network site; forming a subset of the plurality of feature sets by reducing dimensionality of the plurality of feature sets; generating a plurality of clusters of the subset of the plurality of feature sets, each cluster being associated with a label representing a different type of activeness on the network site; and generating a database query set based on the plurality of clusters and the plurality of feature sets to classify one or more activities on the network site into one of the plurality of clusters.

Figure 15:
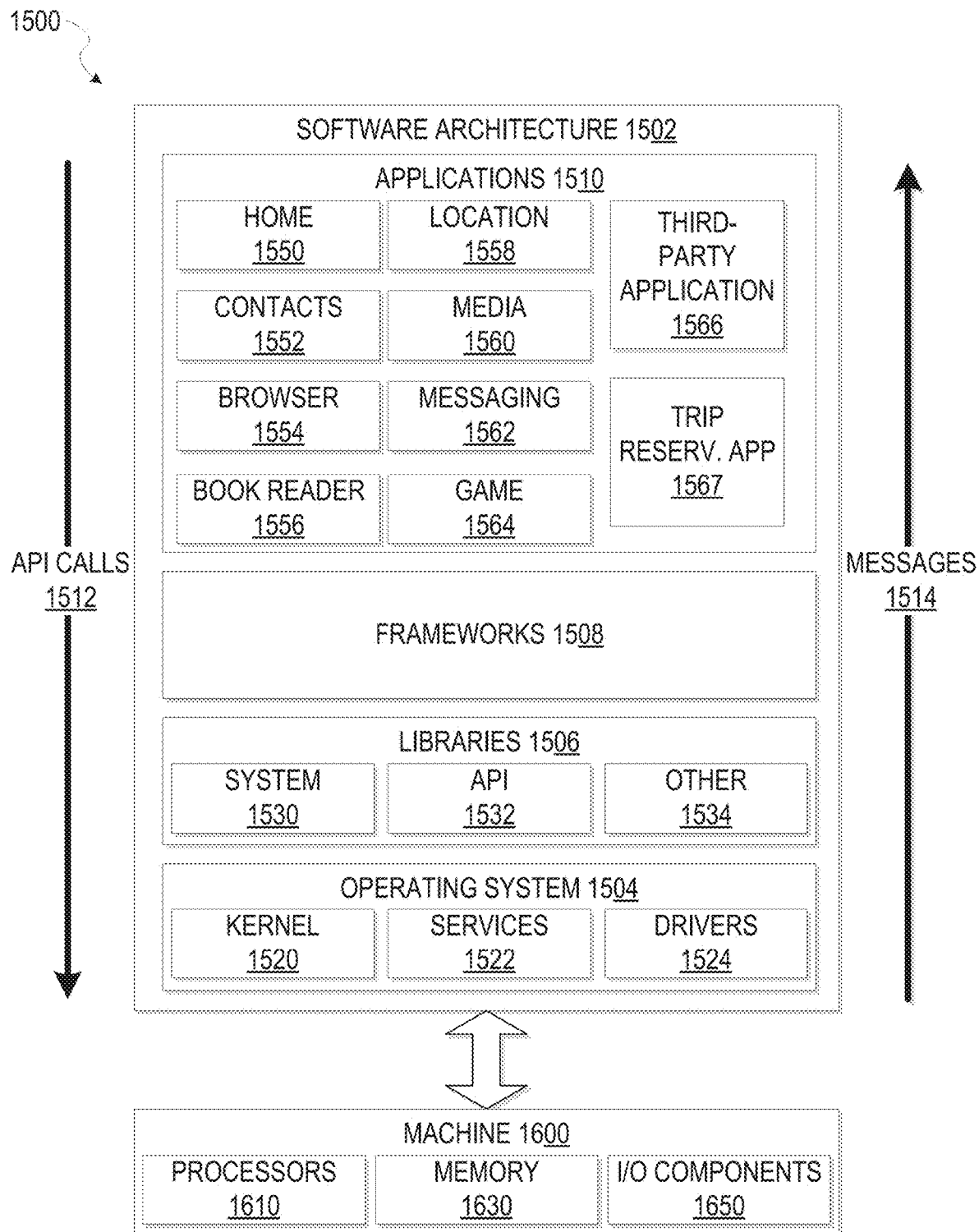
FIG. 15 is a block diagram illustrating an example of a software architecture that may be installed on a machine, according to some examples.

FIG. 15 is a block diagram 1500 illustrating a software architecture 1502, which can be installed on any one or more of the devices described above. For example, in various examples, the client device 110 and server systems 130, 102, 120, 122, and 124 may be implemented using some or all of the elements of the software architecture 1502. FIG. 15 is merely a nonlimiting example of a software architecture, and it will be appreciated that many other architectures can be implemented to facilitate the functionality described herein. In various examples, the software architecture 1502 is implemented by hardware such as a machine 1600 of FIG. 16 that includes processors 1610, memory 1630, and input/output (I/O) components 1650. In this example, the software architecture 1502 can be conceptualized as a stack of layers where each layer may provide a particular functionality. For example, the software architecture 1502 includes layers such as an operating system 1504, libraries 1506, frameworks 1508, and applications 1510. Operationally, the applications 1510 invoke API calls 1512 through the software stack and receive messages 1514 in response to the API calls 1512, consistent with some examples.

In various implementations, the operating system 1504 manages hardware resources and provides common services. The operating system 1504 includes, for example, a kernel 1520, services 1522, and drivers 1524. The kernel 1520 acts as an abstraction layer between the hardware and the other software layers, consistent with some examples. For example, the kernel 1520 provides memory management, processor management (e.g., scheduling), component management, networking, and security settings, among other functionalities. The services 1522 can provide other common services for the other software layers. The drivers 1524 are responsible for controlling or interfacing with the underlying hardware, according to some examples. For instance, the drivers 1524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some examples, the libraries 1506 provide a low-level common infrastructure utilized by the applications 1510. The libraries 1506 can include system libraries 1530 (e.g., C standard library) that can provide functions such as memory allocation functions, string manipulation functions, mathematic functions, and the like. In addition, the libraries 1506 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 1506 can also include a wide variety of other libraries 1534 to provide many other APIs to the applications 1510.

The frameworks 1508 provide a high-level common infrastructure that can be utilized by the applications 1510, according to some examples. For example, the frameworks 1508 provide various graphic user interface (GUI) functions, high-level resource management, high-level location services, and so forth. The frameworks 1508 can provide a broad spectrum of other APIs that can be utilized by the applications 1510, some of which may be specific to a particular operating system 1504 or platform.

In an example, the applications 1510 include a home application 1550, a contacts application 1552, a browser application 1554, a book reader application 1556, a location application 1558, a media application 1560, a messaging application 1562, a game application 1564, and a broad assortment of other applications, such as a third-party application 1566. According to some examples, the applications 1510 are programs that execute functions defined in the programs. Various programming languages can be employed to create one or more of the applications 1510, structured in a variety of manners, such as object-oriented programming languages (e.g., Objective-C, Java, C++) or procedural programming languages (e.g., C or assembly language). In a specific example, the third-party application 1566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1566 can invoke the API calls 1512 provided by the operating system 1504 to facilitate functionality described herein.

Some examples may particularly include a trip reservation application 1567, which may be any application that requests data or other tasks to be performed by systems and servers described herein, such as the server system 102, third-party servers 130, and so forth. In certain examples, this may be a standalone application that operates to manage communications with a server system such as the third-party servers 130 or server system 102. In other examples, this functionality may be integrated with another application. The trip reservation application 1567 may request and display various data related to an online marketplace and may provide the capability for a user 106 to input data related to the system via voice, touch interface, or keyboard, or using a camera device of the machine 1600; communication with a server system via the I/O components 1650; and receipt and storage of object data in the memory 1630. Presentation of information and user inputs associated with the information may be managed by the trip reservation application 1567 using different frameworks 1508, library 1506 elements, or operating system 1504 elements operating on a machine 1600.

Figure 16:
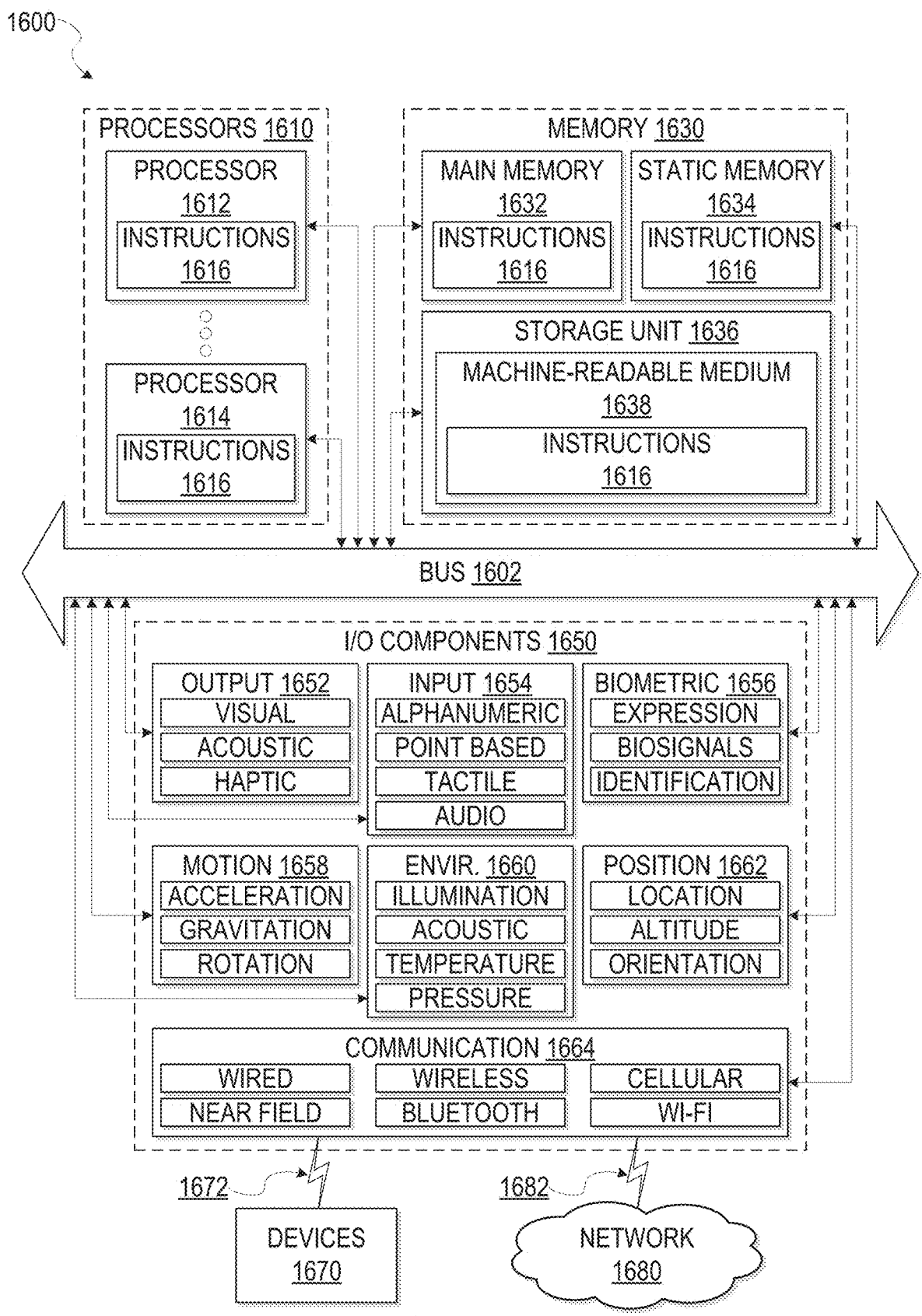
FIG. 16 illustrates a diagrammatic representation of a machine, in the form of a computer system, within which a set of instructions may be executed for causing the machine to perform any one or more of the methodologies discussed herein, according to some examples.

FIG. 16 is a block diagram illustrating components of a machine 1600, according to some examples, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application 1510, an applet, an app, or other executable code) for causing the machine 1600 to perform any one or more of the methodologies discussed herein can be executed. In alternative examples, the machine 1600 operates as a standalone device or can be coupled (e.g., networked) to other machines. In a networked deployment, the machine 1600 may operate in the capacity of a server system 130, 102, 120, 122, 124, and the like, or a client device 110 in a server-client network environment, or as a peer machine in a peer-to-peer (or distributed) network environment. The machine 1600 can comprise, but not be limited to, a server computer, a client computer, a personal computer (PC), a tablet computer, a laptop computer, a netbook, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

In various examples, the machine 1600 comprises processors 1610, memory 1630, and I/O components 1650, which can be configured to communicate with each other via a bus 1602. In an example, the processors 1610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 1612 and a processor 1614 that may execute the instructions 1616. The term "processor" is intended to include multi-core processors 1610 that may comprise two or more independent processors 1612, 1614 (also referred to as "cores") that can execute instructions 1616 contemporaneously. Although FIG. 16 shows multiple processors 1610, the machine 1600 may include a single processor 1610 with a single core, a single processor 1610 with multiple cores (e.g., a multi-core processor 1610), multiple processors 1612, 1614 with a single core, multiple processors 1612, 1614 with multiple cores, or any combination thereof.

The memory 1630 comprises a main memory 1632, a static memory 1634, and a storage unit 1636 accessible to the processors 1610 via the bus 1602, according to some examples. The storage unit 1636 can include a machine-readable medium 1638 on which are stored the instructions 1616 embodying any one or more of the methodologies or functions described herein. The instructions 1616 can also reside, completely or at least partially, within the main memory 1632, within the static memory 1634, within at least one of the processors 1610 (e.g., within the processor's cache memory), or any suitable combination thereof, during execution thereof by the machine 1600. Accordingly, in various examples, the main memory 1632, the static memory 1634, and the processors 1610 are considered machine-readable media 1638.

As used herein, the term "memory" refers to a machine-readable medium 1638 able to store data temporarily or permanently and may be taken to include, but not be limited to, RAM, read-only memory (ROM), buffer memory, flash memory, and cache memory. While the machine-readable medium 1638 is shown, in an example, to be a single medium, the term "machine-readable medium" should be taken to include a single medium or multiple media (e.g., a centralized or distributed database, or associated caches and servers) able to store the instructions 1616. The term "machine-readable medium" shall also be taken to include any medium, or combination of multiple media, that is capable of storing instructions (e.g., instructions 1616) for execution by a machine (e.g., machine 1600), such that the instructions 1616, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other nonvolatile memory (e.g., erasable programmable read-only memory (EPROM)), or any suitable combination thereof. The term "machine-readable medium" specifically excludes nonstatutory signals per se.

The I/O components 1650 include a wide variety of components to receive input, provide output, produce output, transmit information, exchange information, capture measurements, and so on. In general, it will be appreciated that the I/O components 1650 can include many other components that are not shown in FIG. 16. The I/O components 1650 are grouped according to functionality merely for simplifying the following discussion, and the grouping is in no way limiting. In various examples, the I/O components 1650 include output components 1652 and input components 1654. The output components 1652 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further examples, the I/O components 1650 include biometric components 1656, motion components 1658, environmental components 1660, or position components 1662, among a wide array of other components. For example, the biometric components 1656 include components to detect expressions (e.g., hand expressions, facial expressions, vocal expressions, body gestures, eye tracking), measure biosignals (e.g., blood pressure, heart rate, body temperature, perspiration, brain waves), identify a person (e.g., voice identification, retinal identification, facial identification, fingerprint identification, electroencephalogram-based identification), and the like. The motion components 1658 include acceleration sensor components (e.g., accelerometer), gravitation sensor components, rotation sensor components (e.g., gyroscope), and so forth. The environmental components 1660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1662 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 include a network interface component or another suitable device to interface with the network 1680. In further examples, communication components 1664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1670 may be another machine 1600 or any of a wide variety of peripheral devices (e.g., a peripheral device coupled via a USB).

Moreover, in some examples, the communication components 1664 detect identifiers or include components operable to detect identifiers. For example, the communication components 1664 include radio frequency identification (RFID) tag reader components, NFC smart tag detection components, optical reader components (e.g., an optical sensor to detect one-dimensional bar codes such as a Universal Product Code (UPC) bar code, multidimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1664, such as location via Internet Protocol (IP) geo-location, location via WI-FI® signal triangulation, location via detecting a BLUETOOTH® or NFC beacon signal that may indicate a particular location, and so forth.

In various examples, one or more portions of the network 1680 can be an ad hoc network, an intranet, an extranet, a VPN, a LAN, a WLAN, a WAN, a WWAN, a MAN, the internet, a portion of the internet, a portion of the PSTN, a plain old telephone service (POTS) network, a cellular telephone network, a wireless network, a WI-FI® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile (GSM) communications connection, or another type of cellular or wireless coupling. In this example, the coupling 1682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In an example, the instructions 1616 are transmitted or received over the network 1680 using a transmission medium via a network interface device (e.g., a network interface component included in the communication components 1664) and utilizing any one of a number of well-known transfer protocols (e.g., HTTP). Similarly, in other examples, the instructions 1616 are transmitted or received using a transmission medium via the coupling 1672 (e.g., peer-to-peer coupling) to the devices 1670. The term "transmission medium" shall be taken to include any intangible medium that is capable of storing, encoding, or carrying the instructions 1616 for execution by the machine 1600, and includes digital or analog communications signals or other intangible media to facilitate communication of such software.

Furthermore, the machine-readable medium 1638 is non-transitory (in other words, not having any transitory signals) in that it does not embody a propagating signal. However, labeling the machine-readable medium 1638 "non-transitory" should not be construed to mean that the medium is incapable of movement; the machine-readable medium 1638 should be considered as being transportable from one physical location to another. Additionally, since the machine-readable medium 1638 is tangible, the machine-readable medium 1638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific examples, various modifications and changes may be made to these examples without departing from the broader scope of examples of the present disclosure.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of examples of the present disclosure as represented by the appended claims. The specification and drawings are, accordingly, to be regarded in an illustrative rather than a restrictive sense.

What is claimed is:

1. A method comprising:
    accessing data representing activity on a network site;
    generating, based on the data, a plurality of feature sets representing periods of activeness on the network site;
    computing a streakiness metric for each listing of a plurality of listings, the streakiness metric representing a number of uninterrupted consecutive days that an accommodation associated with each listing was booked or available to be booked; and
    generating the plurality of feature sets based on the plurality of listings, an availability rate, and the streakiness metric of each listing of the plurality of listings;
    forming a subset of the plurality of feature sets by reducing dimensionality of the plurality of feature sets comprising applying a principal component analysis model to the plurality of feature sets to generate the subset of the plurality of feature sets;
    generating a plurality of clusters of the subset of the plurality of feature sets, each cluster being associated with a label representing a different type of activeness on the network site; and
    generating a database query set based on the plurality of clusters and the plurality of feature sets to classify one or more activities on the network site into one of the plurality of clusters.

2. The method of claim 1, wherein the data comprises the plurality of listings associated with accommodation reservations provided by different users on the network site.

3. The method of claim 2, further comprising:
    computing, as the periods of activeness on the network site, periods of availability of each listing of the plurality of listings.

4. The method of claim 3, further comprising:
    accessing historical availability information for each listing of the plurality of listings;
    determining, based on the historical availability information, a number of days within a calendar year that each listing of the plurality of listings was associated with an accommodation that was booked or available to be booked; and
    computing the availability rate for each listing of the plurality of listings based on the number of days associated with each listing of the plurality of listings.

5. The method of claim 4, further comprising:
    dividing the number of days associated with each listing of the plurality of listings by a total number of days within the calendar year.

6. The method of claim 5, further comprising:
    presenting a calendar view representing the availability rate for each listing of the plurality of listings to visually represent an availability pattern for each listing of the plurality of listings.

7. The method of claim 1, further comprising:
    normalizing the streakiness metric based on one or more seasonality factors.

8. The method of claim 7, wherein the one or more seasonality factors comprise at least one of a quarter of availability or number of consecutive months of availability.

9. The method of claim 1, further comprising:
    applying K-means clustering to the subset of the plurality of feature sets to generate the plurality of clusters.

10. The method of claim 9, further comprising:
receiving input that assigns different labels to each cluster in the plurality of clusters.

11. The method of claim 10, wherein the different labels comprise at least one of always on, year long, long seasonal, short seasonal, part time, sporadic, event motivated, or fully blocked.

12. The method of claim 9, further comprising:
applying a decision tree process to the plurality of clusters and the plurality of feature sets to generate the database query set comprising one or more server query language (SQL) queries.

13. The method of claim 1, further comprising:
periodically querying the network site using the database query set to classify the one or more activities on the network site into one of the plurality of clusters.

14. The method of claim 1, further comprising:
controlling a frequency and type of communication with an individual user of the network site based on an individual cluster associated with an activity of the individual user on the network site.

15. The method of claim 14, further comprising:
transmitting a first communication of a first type to a first user in response to determining that activity of the first user is associated with a first cluster of the plurality of clusters; and
transmitting a second communication of a second type to a second user in response to determining that activity of the second user is associated with a second cluster of the plurality of clusters.

16. A system comprising:
a storage device that stores instructions; and
one or more processors configured by the instructions to perform operations comprising:
accessing data representing activity on a network site;
generating, based on the data, a plurality of feature sets representing periods of activeness on the network site;
computing a streakiness metric for each listing of a plurality of listings, the streakiness metric representing a number of uninterrupted consecutive days that an accommodation associated with each listing was booked or available to be booked; and
generating the plurality of feature sets based on the plurality of listings, an availability rate, and the streakiness metric of each listing of the plurality of listings;
forming a subset of the plurality of feature sets by reducing dimensionality of the plurality of feature sets comprising applying a principal component analysis model to the plurality of feature sets to generate the subset of the plurality of feature sets;
generating a plurality of clusters of the subset of the plurality of feature sets, each cluster being associated with a label representing a different type of activeness on the network site; and
generating a database query set based on the plurality of clusters and the plurality of feature sets to classify one or more activities on the network site into one of the plurality of clusters.

17. A non-transitory computer-readable medium comprising instructions stored thereon that are executable by at least one processor to cause a computing device to perform operations comprising:
accessing data representing activity on a network site;
generating, based on the data, a plurality of feature sets representing periods of activeness on the network site;
computing a streakiness metric for each listing of a plurality of listings, the streakiness metric representing a number of uninterrupted consecutive days that an accommodation associated with each listing was booked or available to be booked; and
generating the plurality of feature sets based on the plurality of listings, an availability rate, and the streakiness metric of each listing of the plurality of listings;
forming a subset of the plurality of feature sets by reducing dimensionality of the plurality of feature sets comprising applying a principal component analysis model to the plurality of feature sets to generate the subset of the plurality of feature sets;
generating a plurality of clusters of the subset of the plurality of feature sets, each cluster being associated with a label representing a different type of activeness on the network site; and
generating a database query set based on the plurality of clusters and the plurality of feature sets to classify one or more activities on the network site into one of the plurality of clusters.

18. The non-transitory computer-readable medium of claim 17, wherein the data comprises the plurality of listings associated with accommodation reservations provided by different users on the network site.

19. The non-transitory computer-readable medium of claim 17, the operations comprising controlling a frequency and type of communication with an individual user of the network site based on an individual cluster associated with an activity of the individual user on the network site.

20. The non-transitory computer-readable medium of claim 17 the operations comprising periodically querying the network site using the database query set to classify the one or more activities on the network site into one of the plurality of clusters.

\* \* \* \* \*